Patented May 14, 1940

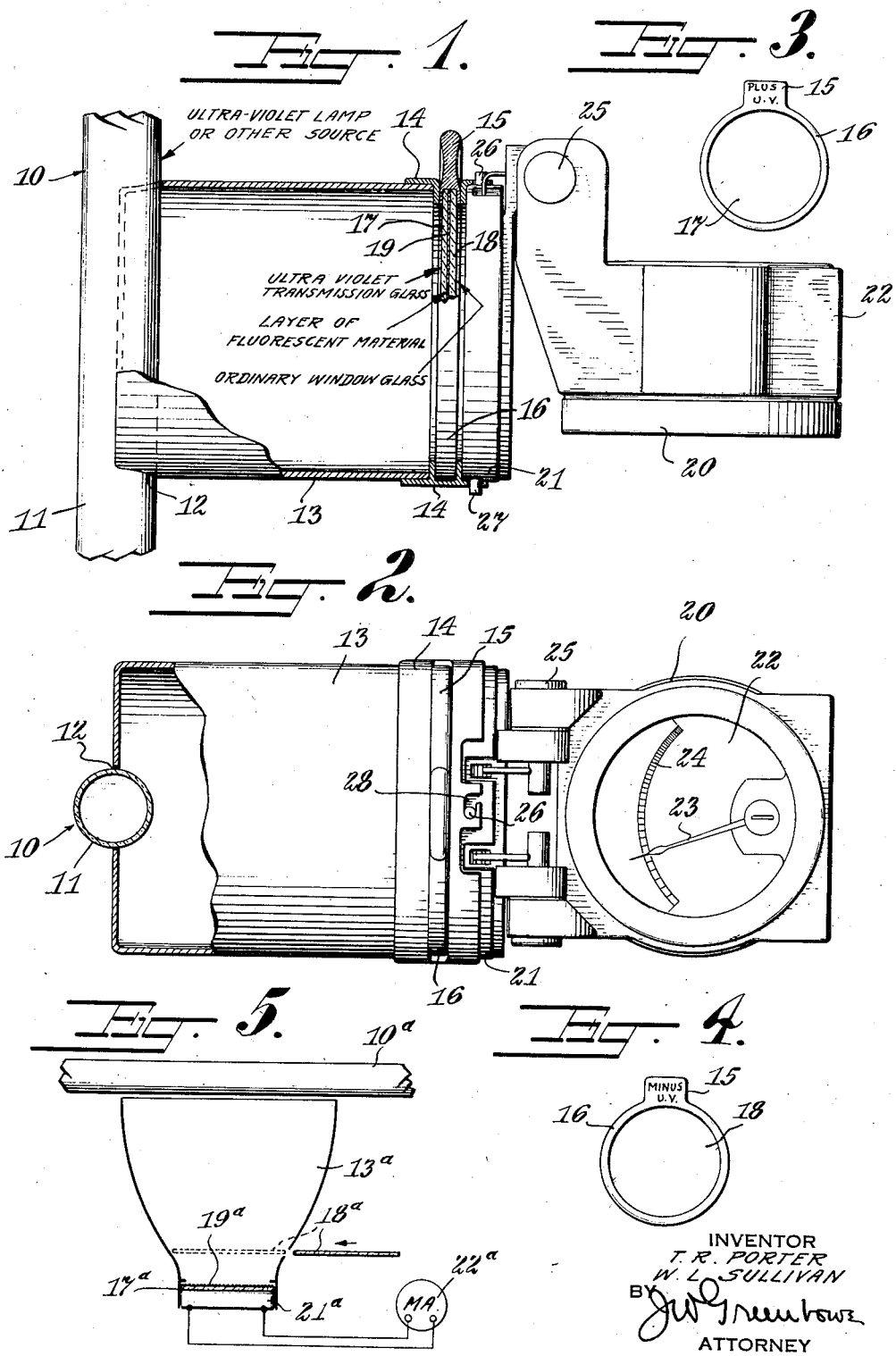

2,200,853

UNITED STATES PATENT OFFICE 2,200,853

APPARATUS FOR MEASURING ULTRA-VIOLET RADIATIONS

Thomas R. Porter and William L. Sullivan, Bloomfield, N. J., assignors to Westinghouse Electric & Manufacturing Company, East Pittsburgh, Pa., a corporation of Pennsylvania Application October 23, 1937, Serial No. 170,630

8 Claims. (Cl. 250—71)

This invention relates to apparatus for measuring ultraviolet radiations and is particularly adapted for the measurement of such when accompanying infra-red radiations and/or visible light.

The principal object of our invention, generally considered, is the measurement of ultraviolet radiations by a method in which the total, including the infra-red and/or visible radiations, is first determined and then what is left after the ultraviolet radiations are screened out, the difference between the two readings being a direct indication of the amount of ultraviolet radiations.

Another object of our invention is the provision of apparatus for measuring ultraviolet radiations, which is particularly adapted for use when the intensity of such radiations is so low that the absorption factor of filters creates a problem in obtaining direct readings or measurements.

A further object of our invention is the measurement of ultraviolet radiations by first changing them into visible light by means such as fluorescent material, and then measuring such light by a suitable photovoltaic cell.

Other objects and advantages of the invention, relating to the construction and arrangement of the various parts, will become apparent as the description proceeds.

Referring to the drawing illustrating our invention:

Fig. 1 is an elevational view, partly in vertical section, of apparatus for practicing our invention.

Fig. 2 is a partial plan and partial horizontal sectional view of the apparatus shown in Fig. 1.

Fig. 3 is an elevational view of the composite filter used with the apparatus shown in Figs. 1 and 2, looking at the ultraviolet transmitting glass therein.

Fig. 4 is a view corresponding to Fig. 3, but looking at the other side of the filter.

Fig. 5 is a diagrammatic view corresponding to Fig. 1, but showing another embodiment of our invention.

Ultraviolet radiations received from many sources are usually accompanied by visible light and infra-red radiations. The use of filters for separating the different kinds of radiations to measure them individually is practical where there is sufficient intensity to allow for the absorption of the shorter wave lengths, but, where the intensity of the radiations is low, the absorption factor of the filter creates a problem in obtaining direct readings or measurements of the ultraviolet radiations.

It has been found that a measurement of ultraviolet radiations can be made by placing a glass, or other transparent substance, coated with selected fluorescent material, such as zinc silicate, on the side facing the light source, shielded from any extraneous light, and disposed immediately above or adjacent a suitable visible light-measuring photovoltaic cell, such as a copper oxide cell, to which is attached a microammeter.

The selected fluorescent material is responsive to the particular band, or range of ultraviolet radiations which it is desired to measure, and these radiations react upon the fluorescent material producing visible light to which the cell is responsive.

The device is held close to the light source, shielded from all extraneous light, and a reading taken on the meter. A second reading is then obtained when a clear glass filter with a known cut-off value, which may be the glass with which the fluorescent material is coated, is interposed between the source of radiations and the fluorescent screen. The difference between the first and second readings is a direct measurement of the amount of radiation in the band, to which the fluorescent material is responsive, between the cut-off value of the glass filter down to the lowest radiations emanating from the light source, provided the fluorescent material is responsive to such lowest radiations.

Referring now to the drawing in detail, like parts being designated by like reference characters, and first considering the embodiment of our invention illustrated in Figs. 1 to 4 inclusive, there is shown a source 10 of ultraviolet radiations, such as a discharge lamp, the envelope 11 of which transmits ultraviolet radiations which are to be measured. The lamp 10 is, in the present embodiment, disposed so as to close an aperture 12 in one end of an opaque walled box or receptacle 13, the other end of which is provided with a holder 14 for a screen 15.

In the present embodiment, the screen 15 consists of a frame 16 holding two pieces of transparent material, such as glass, or other vitreous material, designated by the reference characters 17 and 18. The transparent material 17 is desirably one that freely transmits ultraviolet light and may, for this purpose, be formed of quartz or ultraviolet high-transmission glass. The piece of glass 18 may be ordinary window glass, if such has the desired cut-off characteristics.

Between the pieces of glass 17 and 18 is a layer of fluorescent material 19, which, in the present embodiment, may consist of zinc silicate. As an alternative, the fluorescent material may be applied to the glass 17 which transmits ultraviolet light.

Attached to the other end of the receptacle 13, is a device 20 for measuring visible light, comprising means such as a copper oxide cell or other photovoltaic cell 21 and a microammeter 22 with a pointer 23 and a scale 24, calibrated to read in the desired units of illumination. The photovoltaic cell portion 21 of the device 20 may be pivoted, as indicated at 25, to the indicating portion 22 of the instrument, so that the two may be folded together when not in use. The instrument is adapted for connection to the box or container 13 in any desired manner, as by means of pins 26 and 27 outstanding therefrom and removably connected with respect to said box 13 by being receivable in notches 28 therein and locked in place by turning to the position indicated in Fig. 2.

The apparatus illustrated in Figs. 1 to 4 inclusive may be used as follows:

The source of ultraviolet light which is to be measured, in the present embodiment designated by the reference character 10, is energized, the composite filtering medium 15 being disposed in the position indicated in Fig. 1, so that the ultraviolet transmitting glass 17 faces the source of radiations. This gives a reading on the scale 24 which will represent, the visible light radiated from source 10 and transmitted direct through 17, 19, and 18, plus additional visible light which is radiated from fluorescent material 19 by virtue of its having converted the ultraviolet radiations from source 10 into visible radiations.

The screen 15 is then removed from the container 13 and reversed so that the ordinary window glass, or other absorbing means 18 for ultraviolet light, faces the source 10 of radiations. The means for transposing the positions of the sheets 17 and 18 in the present embodiment, comprises the handle 20 which may be grasped by an operator, sliding movement of the screen 15 being permitted by the holder 14. The ultraviolet radiations from the tube 10, which it is desired to measure, are then absorbed by the glass 18 before reaching the fluorescent material so that no ultraviolet light, of the band to be measured, reaches the fluorescent material 19 to be converted into visible light, and only the visible light radiated from source 10 and transmitted direct through 18, 19, and 17 reaches the photovoltaic cell 21. The difference between the two readings is, therefore, a measure of those ultraviolet radiations, which excited the fluorescent material 19 in the first case, and which were absorbed by the ultraviolet screen 18, in the second case. It is obvious that, by comparing this difference in readings with the readings of any other device which accurately measures ultraviolet radiations of the same wave length, at various degrees of intensity of these radiations, the scale 24 can be accurately calibrated in terms of the units of that other measuring device.

Referring now to the embodiment of our invention illustrated in Fig. 5, an apparatus is there shown which will do the work of that of Figs. 1 to 4 inclusive, but in a slightly different manner. In this figure, the source of ultraviolet radiations may be a discharge tube 10a, as in the preceding embodiment, said tube being disposed above the container 13a so as to allow the radiations therefrom to pass down to the bottom of said container and impinge on a coating 19a of a desired fluorescent material which may be disposed on a sheet 17a of transparent material such as ordinary window glass. Immediately below the sheet of glass 17a is disposed a photovoltaic cell 21a which may be a copper oxide photox cell, as in the first embodiment, connected to a microammeter 22a, having a pointer and scale as previously described.

A reading is first taken of the ultraviolet source 10a, allowing the radiations therefrom to impinge directly on the fluorescent material 19a, while the device is, of course, shielded from all extraneous light, as by being used in a dark room. A second reading is then taken when a clear glass filter 18a is interposed above the fluorescent material, said filter having the desired known cut-off value. As in the previous embodiment, this filter 18a may be made of ordinary window glass, if it is desired to measure the radiations below the cut-off value of such glass. The difference between the first and second readings is a direct measure of the ultraviolet light which excites the fluorescent material during the first reading and which is absorbed by the filter 18a during the second reading, and the intensity of this light may be determined by mere subtraction of the second reading from the first, after the scale of the microammeter 22a has been suitably calibrated by taking readings on sources of light of known intensity in the ultraviolet region being measured.

From the foregoing, it will be seen that we have devised a simplified apparatus and method for measuring the intensity of the ultraviolet radiations in a definite wave length range, which are generated by a given source, by converting said radiations into visible light and measuring the increase in visible light which is due to this conversion. Because we are measuring substantial quantities of light, it is possible to secure accurate readings and thereby determine the value of the selected ultraviolet radiations in the source with reasonable accuracy, even though said value may be small. This method is a considerable improvement over methods which attempt to first filter out all radiations other than ultraviolet, and then measure the ultraviolet radiations direct, particularly when the amount of ultraviolet radiations is small relative to the amount of other radiations.

Although preferred embodiments of our invention have been disclosed, it will be understood that modifications may be made within the spirit and scope of the appended claims.

We claim:

1. Apparatus for measuring ultraviolet radiations comprising a photovoltaic cell and microammeter, and a screen disposed between the source of radiations and said cell, said screen comprising a reversible duplex combination of a sheet of ultraviolet radiations transmitting glass, a sheet of glass which filters the ultraviolet radiations to be measured, and a layer of fluorescent material therebetween.

2. Apparatus for measuring the intensity of ultraviolet radiations received from a source including other radiations, comprising a single photovoltaic cell and microammeter, and a sheet of material transparent to visible light covering said cell and coated on one side with fluorescent material, in combination with removable means for filtering out the ultraviolet light to be measured, from said radiations before it impinges on said fluorescent material.

3. Apparatus for measuring ultraviolet radiations comprising a copper oxide photovoltaic cell and microammeter, and a screen disposed between the source of radiations and said cell, said screen comprising a sheet of material transparent to ultraviolet radiations and coated with zinc silicate, a sheet of material which absorbs the ultraviolet radiations to be measured, and means whereby the positions of said sheets, with respect to said source and cell, may be transposed.

4. Apparatus for measuring ultraviolet radiations comprising a device for measuring visible light, and a screen disposed between the source of radiations and said device, said screen comprising a sheet of material transparent to ultraviolet radiations and coated with fluorescent material, a sheet of material which absorbs the ultraviolet radiations to be measured, and means whereby the position of said screen may be transposed.

5. A reversible screen for use in measuring ultraviolet radiations, comprising a frame in which is mounted a sheet of material adapted to transmit ultraviolet radiations and a sheet of material which absorbs the ultraviolet radiations to be measured, and a layer of fluorescent material disposed adjacent a surface of said ultraviolet transmitting sheet.

6. Apparatus for measuring ultraviolet radiations, comprising a light meter and a screen disposed between the source of said radiations and said meter, and mounted in a holder, permitting sliding movement for removal and insertion, so as to be reversible, said screen comprising a sheet of ultraviolet radiations transmitting glass, a sheet of ultraviolet radiations filtering glass, and a layer of fluorescent material therebetween.

7. A screen for use in combination with a light meter for measuring ultraviolet radiations, comprising a sheet of ultraviolet radiations transmitting material, a sheet of ultraviolet radiations filtering glass, a layer of fluorescent material therebetween, and means whereby the position of said screen with respect to such a light meter may be reversed.

8. Apparatus for measuring ultraviolet radiations, comprising a light meter and a screen disposed between the source of radiations and said meter, said screen comprising a reversible duplex combination of a sheet of ultraviolet radiations transmitting material, a sheet of ultraviolet radiations filtering material, and a layer of fluorescent material therebetween.

THOMAS R. PORTER.
WILLIAM L. SULLIVAN.